United States Patent [19]

Takayanagi

[11] Patent Number: 5,130,809
[45] Date of Patent: Jul. 14, 1992

[54] ELECTROPHOTOGRAPHIC COPIER WITH CONSTANT RATE DATA COMPRESSION AND SIMULTANEOUS STORAGE AND DECOMPRESSION OF COMPRESSED DATA RECEIVED ON A MUTUALLY COUPLED DATA BUS

[75] Inventor: Hiroshi Takayanagi, Kanagawa, Japan

[73] Assignee: Fuji Xerox Co., Ltd., Tokyo, Japan

[21] Appl. No.: 696,075

[22] Filed: May 6, 1991

[51] Int. Cl.⁵ .................... H04N 1/21; H04N 1/417
[52] U.S. Cl. ................................. 358/300; 358/444; 358/430
[58] Field of Search ............... 358/404, 444, 406, 442, 358/443, 426, 430; 365/189.04

[56] References Cited

U.S. PATENT DOCUMENTS

| | | | |
|---|---|---|---|
| 3,675,218 | 7/1972 | Sechler | 365/154 |
| 4,447,891 | 5/1984 | Kadota | 365/189.04 |
| 4,491,937 | 1/1985 | Chan | 365/154 |
| 4,554,645 | 11/1985 | Furman | 365/189.04 |
| 4,884,147 | 11/1989 | Arimoto | 358/443 |

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

An electrophotographic copying machine including an image read unit, a data compressor for compressing image data as read, a data storage unit for storing the image data as compressed by the data compressor, a data decompressor for outputting the decompressed image data, and a control circuit for controlling the respective elements, the control circuit causes stores the image data as read by the image read unit to be stored into the data storage unit, while at the same time causing the image data to be outputted to the image output terminal, so that the storage of the image data occurs substantially concurrently with the output of the image data.

4 Claims, 2 Drawing Sheets

ELECTROPHOTOGRAPHIC COPIER WITH CONSTANT RATE DATA COMPRESSION AND SIMULTANEOUS STORAGE AND DECOMPRESSION OF COMPRESSED DATA RECEIVED ON A MUTUALLY COUPLED DATA BUS

The present invention relates to an electrophotographic or xerographic copying machine and, more particularly, to an electrophotographic copying machine of the image storage type having improved processing speed and having a storage unit for storing image data.

BACKGROUND OF THE INVENTION

1. Discussion of the Related Art

To achieve high copying speed and high copy quality, an electrophotographic copying machine is frequently used in combination with an automatic document feeder, a sorter for receiving different sets of copies, and the like. Such a systematized copying machine saves much labor.

Where a set of originals are copied to produce a plurality of copies of each original, a sorter is used with the copying machine to sort the copies for each set of originals. In such a case, the copying machine produces a necessary number of copies in the order of the originals supplied, and feeds them to receptacles of the sorter. Accordingly, a user cannot know whether or not the copies are correct until the copying machine completes making a plurality of copies of each original. In the case of a large number of originals and a great number of copies of each original, if an incorrect original is mistakenly contained in the set of originals or the set of originals are stacked in an erroneous order, all of the copies of the set of originals must be verified and correctly arranged. The verification and the arrangement consume much time.

In a copying machine with a finisher in addition to the sorter, to staple the sorted copied documents, if the stapled documents contain an error, significant labor is needed to properly rearrange and staple them again.

To copy a great number of originals, an automatic document feeder (ADF) is typically used. In a copying machine using an ADF, a user can place a large number of originals into the ADF. The ADF automatically feeds documents onto the platen of the copying machine in successive order without aid from the user. The copying machine automatically copies the originals thus fed.

The ADF is not available for every type of original document because the ADF drive mechanism is constructed with roller-belt combinations. The ADF is available for sheet like original documents, except those that are too thin or too thick, and is unavailable for bound and stapled original documents.

To make copies of documents that are a combination of ADF-available documents and ADF-unavailable documents, troublesome and time-consuming manual work is required. For example, after the ADF-available original documents have been copied, all of the documents, both ADF-available and ADF-unavailable, must be manually combined. More specifically, to make copies of a combination of ADF-available and ADF-unavailable original documents, the copying machine with the ADF proceeds with the copying operation of those combined original documents, and encounters the ADF-unavailable originals. At this time, the copying operation of the copying machine in the ADF mode is interrupted. The ADF-unavailable original documents are then manually set on the platen glass sheet by sheet. After completion of copying the ADF unavailable original documents, the copying machine is operated again in the ADF mode.

As described above, in the case where a sorter is used with a copying machine, it is impossible to check the order of copies or copied documents as stacked or gathered until the copying of all of the original documents is completed. However, in the case where an ADF is used, and a sorter is not used, and a set of original documents are automatically fed onto the platen glass, a user can recognize an erroneous order of copies at the time of completing the first copy of the set of original documents. Disadvantageously, when a set of original documents is fed many times onto the platen using an ADF, the original documents may incur damage. In this respect, the use of the ADF is unsuitable for copying important original documents.

In the conventional electrophotographic copying machine, light as reflected on the surface of an original document is guided and imaged on a photoreceptor by means of a lens. Accordingly, the input of an image and the exposure of the photoreceptor to the light progresses concurrently. As a result, such conventional copying machines in which an image cannot be stored cannot include any features that enable the above described problems to be solved.

In order to overcome the above described problems, another type of copying machine has recently been developed, in which image data gathered by an image input section is electronically processed and stored. Such a copying machine of the data storage type reads once an image of an original document that is fed by the ADF, and stores the gathered image data into the data storage unit. When a specific number of copies of the original document is required later, the copying machine reads the image data out of the storage unit and produces that required number of copies. Thus, this type of data storage type copying machine can exercise a function equivalent to the repetitive feeding of an original document into the platen, by using the data storage unit, without actually repetitively feeding the original document.

FIG. 2 is a block diagram showing an electrophotographic digital copying machine capable of electronically processing image data. In the illustrated digital copying machine, an image input terminal (IIT) 20 reads an image of an original document by using a CCD line sensor, and converts into a digital image signal an analog video signal generated by the CCD sensor. An image processing system (IPS) 21 executes signal correction functions and the like. A compressor compresses a data. The data thus compressed is stored in a data storage unit 22 such as a hard disk (HD).

An image output terminal (IOT) 23 reads a data after decompressing the data stored in the storage unit 22 and controls the turning on and off of a light source, such as a laser, according to the data, to thereby form pixels on a photoreceptor. In this manner, the image of the original document is reproduced.

In the digital electrophotographic copying machine with a data storage unit, such as the storage unit 22, the image data is read out of the storage unit, and various types of editing operations may be applied to the image data. Such copying machines may also include a system for compressing the image data for storage There are many systems for compressing the image data. For example, a data compressing system, such as MH, MR, MMR and so on, based on a data compressing algorithm as regulated by the international organization, CCITT (Consultative Committee of International Telegraph and Telephone), is widely employed for facsimile systems.

In the CCITT data compressing algorithm, the image data is encoded according to a predetermined pattern of run-lengths of pixels. The algorithm is an effective means for encoding binary data of black and white such as occurs in a facsimile system. In the case of encoding image data, the data compressing speed and hence the data compressing rate varies with the nature of the image data.

For image data such as is processed by a facsimile system where the image reading speed is not fast, and the resolution of the reading of an image is low, e.g., 200 dpi at most, the variation of the data compressing speed, or the compressing rate, has little influence on the performance of data transmission and data processing.

In an electrophotographic digital copying machine, however, the image resolution is very high, e.g., approximately 400-600 dpi and the image is read at a much higher speed than in the facsimile system and at a much higher density than in the facsimile system. Further, a large amount of image data is processed by the copying machine. Since the data compressing speed varies, the inputting of the image data derived from the image input terminal is asynchronous with the operation of the image output terminal which operates at a fixed speed, such as a xerographic unit. Further, in the case where a compressor is integrally formed with a decompressor, it is impossible to operate the compression and the decompression at the same time. To accommodate this asynchronous operation, the electrophotographic copying machine containing a compressor and a decompressor stores all of the compressed image data in a data storage unit, and the decompressor decompresses previously stored data to enable output of reproduced images. For this reason, the image input terminal and the image output terminal are operable at high speed. However, the operation speed of an overall system of the copying machine is at a slow speed because of the asynchronous nature of the compression, image storage, image retrieval and decompression processes.

SUMMARY OF THE INVENTION

The present invention has been made in view of the above circumstances and has as an object to provide an electrophotographic copying machine with a data storage unit which allows the image data to be output during a period in which the image data is stored into the storage unit, to thereby reduce the time to output the image data.

Additional objects and advantages of the invention will be set forth in part in the description which follows and in part will be obvious from the description, or may be learned by practice of the invention. The objects and advantages of the invention may be realized and attained by means of the instrumentalities and combination particularly pointed out in the appended claims.

To achieve the objects and in accordance with the purpose of the invention, as embodied and broadly described herein, there is provided an electrophotographic copying machine including image read means for reading an original document, data compressing means for compressing the original image data, data storage means for storing the image data as compressed by the data compressing means, data decompressing means for decompressing the compressed data, image output means for print-outputting the decompressed image data, and control means for controlling the various means wherein the control means controls the storage means to store the compressed image data and at substantially the same time controls the decompressor means to output the decompressed image data to said image output means, so that the storage of the image data occurs substantially concurrently with the output of the decompressed image data. With such an arrangement, the productivity of the electrophotographic copying machine is improved.

In the copying machine thus arranged, the image data derived from the image read means is compressed and stored into the data storage means, and at the same time the compressed image data is decompressed by the decompressing means into the original image data, and the decompressed data is output to the image output section. Accordingly, the image data can be output to the image output section during a period of time to store the image data into the data storage means. The result is to reduce the image output time.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENT

Figure 1:
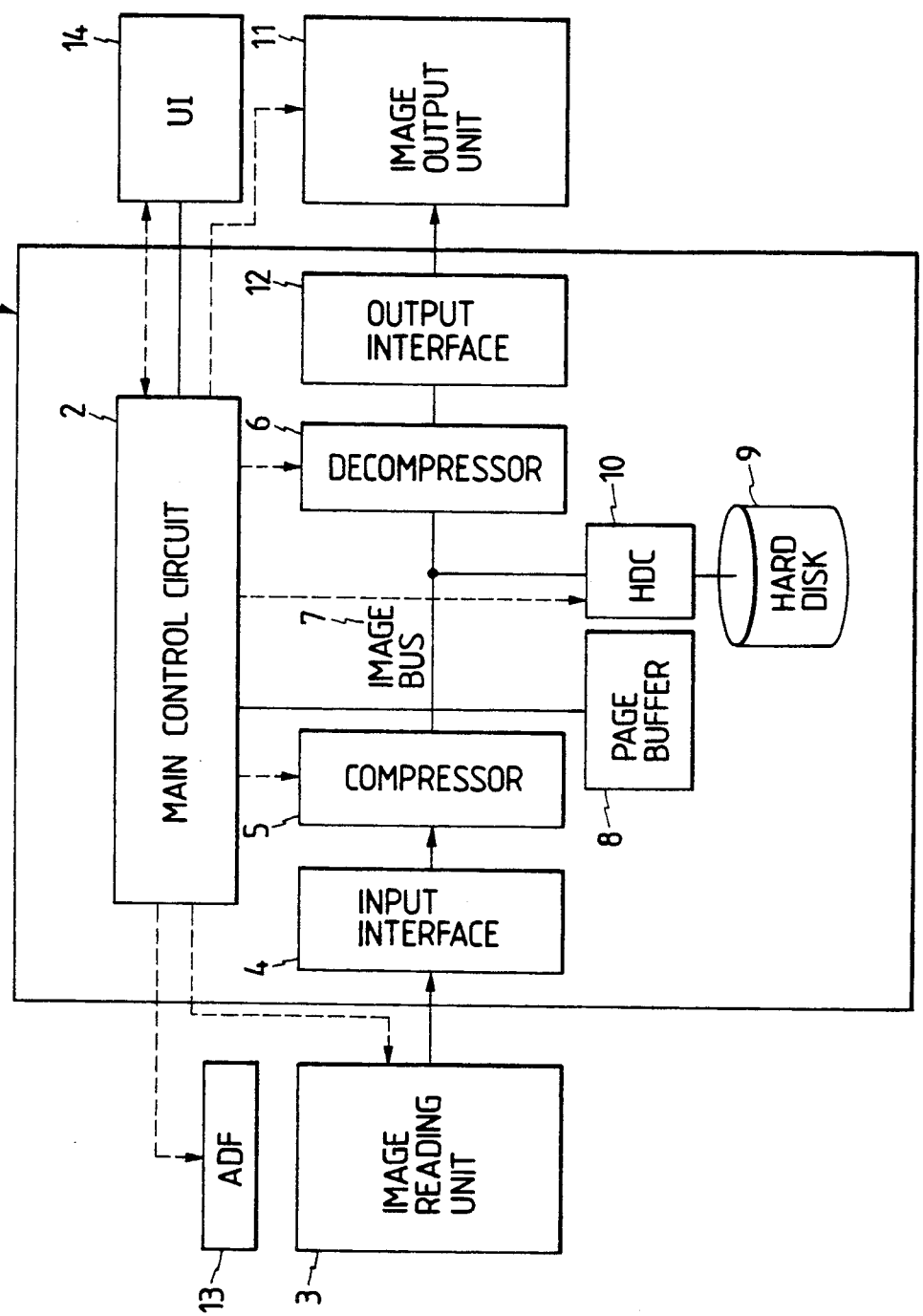
FIG. 1 is a block diagram showing an embodiment of an electrophotographic copying machine according to the present invention.
Figure 2:
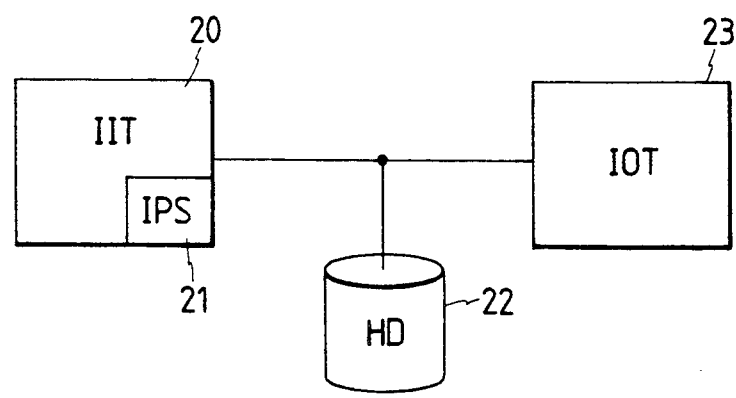
FIG. 2 is a block diagram showing a conventional digital copying machine capable of electronically processing image data.

Referring to FIG. 1 which is a block diagram showing an embodiment of a digital electrophotographic copying machine according to the present invention, a main control unit 1 includes a main control circuit 2 for controlling the related portions and executing edits among document pages, an input interface (I/F) 4 for receiving image data as read by an image read unit 3, a compressor 5 that receives original image data from I/F 4 and compresses the received original image data, a decompressor 6 for decompressing the compressed image data into the original image data, an image bus 7 for transferring the compressed image data, a page buffer 8 for temporarily storing the compressed image data when it is transferred to and from a data storage memory, a hard disk 9 which serves as the data storage memory for storing a large amount of image data, a hard disk controller (HDC) 10 for controlling the hard disk 9, and an output interface (I/F) 12 for outputting the image data to an image output unit 11.

The image read unit 3 is an image reading device which reads an image of a document by use of a CCD sensor, for example. The image read unit 3 executes an offset adjustment operation and a gain adjustment operation of the read image signals. After these operation, an A/D converter converts analog image data into digital image data. Then the image read unit 3 executes the operation of gap correction, shading correction, etc, of the digital image data and executes image processing, such as reduction/magnification, shading, inclination and so on. In the case where a color document is read, the image read unit 3 reads a color document and produces image data of three primary colors, R (red), G (green), and B (blue), and applies to the image data various processings such as END (equivalent neutral density conversion), color masking, document size detection, color change, UCR (under color removal), black generation, mesh-point removal, edge emphasis, TRC (tone reduction control), enlargement/reduction, edits, and the like.

An ADF (automatic document feeder) 13 is coupled with the image read device 3, and automatically feeds original documents to be read, in successive order.

An image output unit 11 is preferably provided as a laser printer which controls a laser beam for every pixel of the image according to a data as generated from the image data, and reproduces a halftone image with mesh dots.

A UI (user interference) 14 is constructed with a display, such as a CRT or a liquid crystal display, and a control panel, and the like. A user may enter various functions and editing commands to the machine. Items so entered by a user are displayed on the display of the user interface 14.

The compressor 5 functions to compress a large amount of image data so as to be efficiently stored into the storage unit.

The decompressor 6 functions to decompress the compressed image data into the original image data, and to supply the decompressed data to the image output unit 11.

The page buffer 8 is a semiconductor memory which is capable of storing the image data of at least one page of a document, and is operable at high speed. When image data is written into and read out of the storage unit, the image data is temporarily stored in the page buffer 8. The page buffer 8 may also be used as a data storage means for storing an amount of image data whose amount is too small to be stored on the hard disk.

The hard disk 9 is a data storage unit for storing a large amount of compressed image data, and has a memory capacity of several tens of M-bytes to several hundreds of M-bytes. The data transfer to and from the hard disk is controlled by the hard disk controller 10.

When the above noted CCITT data compressing algorithm that is currently employed for facsimile systems, is used, the data compressing rate varies, and hence the data compressing system fails to synchronize the data storing operation with the data outputting operation. Therefore, for a digital electrophotographic copying machine, in accordance with the invention, it is necessary to use a data compressing algorithm that provides a constant data compressing rate.

Known data compressing algorithms that provide a constant data compressing rate are, for example, a block approximation that is used for data compressing of a still video image for a television, a vector quantizing system, and an adaptive prediction coding system. Use of the adaptive prediction coding system is preferred herein.

The adaptive prediction coding system is described next. In that coding system, binary image data is predicted every eight bits simultaneously by using several tens of predictors of different types, such as a predictor referring, for prediction, to a value of a pixel at the same position in the previous scan line, a predictor for referring to a pixel that precedes the present pixel for prediction, a predictor referring to pixels several bits to several tens of bits prior to the present pixel, a predictor for predicting a predictive value on the basis of the statistical nature of a plurality of reference pixels, and the like. Of those predictors, a predictor of the highest order of prediction is used for predicting the next 8 pixels.

In this case, "0" is assigned to a signal indicative of a pixel whose prediction is true, while "1" is assigned to a signal indicative of a pixel whose prediction is untrue. Four bits of perspective error signals are called one nibble. Run-lengths of successive zero nibbles (each expressed by "0000") are encoded.

In order for the decompressor to decompress the compressed image data, it is necessary to transfer to the decompressor the manner in which the data was compressed. This may be realized by either of two methods. In accordance with the first method, a signal that is indicative of which predictor was used to compress data is sent to the decompressor. In accordance with the second method, the compressor and decompressor each employ the same algorithm, and an appropriate predictor is selected on the basis of the data already reproduced at the stage of decompressing. Either the first or second predictive method is available, although the latter is preferable because no additional information to select the predictor is required.

In the electrophotographic copying machine of the illustrated embodiment of the present invention, when an image is read at a scanning speed of 200 mm/sec. with a resolution of and 600 dpi, it requires approximately 210 microseconds to read the image data of one scan line. The image data thus read is compressed at a constant compressing rate by the compressor. The compressed data is transferred via the image data bus 7 to the page buffer 8 before it is stored into the hard disk 9. Substantially simultaneously, the image data is input to the decompressor 6 that is also coupled to the image data bus 7. The compressed data is intermittently output in units of bytes or words. Data is output from the decompressor 6 after one scan line of data has been decompressed. Because image data is processed at the rate of 210 microsecond per scan line, as compared to approximately 1 sec. as the time for a high speed image output device to output a reproduced image on an A4 document, the time for scanning, compressing and decompressing is shorter than the tine required for the image output device to input a reproduced image. As a result scanning can occur concurrently with outputting of the reproduced image.

Further, the electrophotographic copying machine can also be applied to receive image data as electronically prepared by personal computers and as received by a facsimile, in addition to image data received from an image read device such as a scanner.

In the case where the data received at the copying machine is code data, the code data is converted into image data by a decomposer (not shown), contained in the copying machine, which converts the data to bit map data. The image data thus converted can be output from the image output unit solely or in combination with the image data received from the image input section. Also in this case, the image data from the external device is compressed and stored, while at the same time being output to the image output unit.

As seen from the foregoing description, in an electrophotographic copying machine including image read means, data compressing means for compressing image data as read, data storage means for storing the image data as compressed by the data compressing means, data decompressing means for decompressing the compressed data, image output means for outputting the decompressed image data, and control means for controlling the respective means, the control means causes the image data as read by the image read means to be stored into the data storage means, while at the same time outputting the image data to the image output section, whereby the storage of the image data is performed substantially concurrently with the output of the image data Such an arrangement reduces the image output time of the copying machine, and provides an effective and rapid copying operation.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electrophotographic copying machine, comprising:
   image reading means for reading an original document and providing original image data;
   data compressing means for compressing the original image data to provide compressed image data, said data compressing means for applying a data compressing algorithm having a constant rate of compression;
   data storage means for storing the compressed image data;
   data decompressing means for decompressing the compressed image data to provide decompressed image data;
   data bus means, coupled to said data compressing means, said data storage means and said data decompressing means, for conducting the compressed image data from said data compressing means to said data storage means and to said data decompressing means;
   image output means for printing the decompressed image data; and
   control means for controlling the operation of said image reading means, data compressing means, data decompressing means, data storage means, and image output means, wherein said control means controls said data storage means to store the compressed image data and at substantially the same time controls said data decompressing means to decompress the compressed image data received on said data bus means to output the decompressed image data to said image output means such that the storage of the image data occurs substantially concurrently with the output of the decompressed image data.

2. The electrophotographic copying machine of claim 1 wherein the data compressing algorithm uses an adaptive prediction coding system.

3. The electrophotographic copying machine of claim 2 wherein the compressing means and decompressing means employ the same adaptive prediction coding system to respectively compress and decompress the image data and a predictor is selected on the basis of the decompressed image data already provided by said decompressing means.

4. The electrophotographic copying machine of claim 1 wherein said data storage means includes:
   a page buffer coupled to said data bus means; and
   disk storage means, coupled to said page buffer, for storing compressed image data received from the page buffer.

* * * * *